US012789572B1

(12) United States Patent
Weston et al.

(10) Patent No.: US 12,789,572 B1
(45) Date of Patent: Nov. 10, 2026

(54) COMBINED SHOCK ABSORBER AND JOUNCE BUMPER BODY FOR A VEHICLE SUSPENSION ASSEMBLY

(71) Applicant: Ford Global Technologies, LLC, Dearborn, MI (US)

(72) Inventors: Keith Weston, Canton, MI (US); Prudhvi Vemulapalli, Livonia, MI (US); Justin Applegate, Walled Lake, MI (US); Amad Wahib, Hamtramck, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/327,020

(22) Filed: Sep. 12, 2025

(51) Int. Cl.
*B60G 15/06* (2006.01)

(52) U.S. Cl.
CPC .................................. *B60G 15/063* (2013.01)

(58) Field of Classification Search
CPC ........................................................ F16F 9/49
See application file for complete search history.

(56) References Cited

U.S. PATENT DOCUMENTS 3,111,201 A 11/1963 Bliven et al.
6,186,486 B1 2/2001 Gutman et al.
11,376,912 B2 7/2022 Koff
11,383,571 B2 7/2022 Anderson
2008/0179148 A1 7/2008 Quinn et al.
2010/0042293 A1 2/2010 Moshchuk et al.
2014/0252707 A1 9/2014 Fleniken et al.
2015/0192187 A1* 7/2015 Smith ....................... F16F 9/48 188/284
2015/0321532 A1 11/2015 Reybrouck
2017/0240019 A1 8/2017 Six et al.
2018/0194186 A1 7/2018 Anderson
2019/0257381 A1 8/2019 Patil et al.
2021/0317893 A1* 10/2021 Krause ...................... F16F 9/49
2023/0003277 A1 1/2023 Reynolds et al.
2023/0150328 A1 5/2023 Sosa et al.
2024/0084874 A1 3/2024 Regner et al.
2024/0391283 A1* 11/2024 Apone ...................... F16F 9/49

FOREIGN PATENT DOCUMENTS

JP 5467110 B2 4/2014

* cited by examiner

*Primary Examiner* — Jason D Shanske
*Assistant Examiner* — Matthew James O'Neill
(74) *Attorney, Agent, or Firm* — Burr & Forman; Lorne Forsythe

(57) ABSTRACT

The suspension system may include a shock absorber to dampen vehicle movement, and a hydraulic jounce bumper to provide additional damping to the suspension system. The shock absorber may include a first end operably coupled to a frame of the vehicle and a second end operably coupled to a wheel assembly of the vehicle, and the hydraulic jounce bumper may include a mounting end and engagement end. The first end of the shock absorber and the mounting end of the hydraulic jounce bumper may integrate within a singular body.

18 Claims, 10 Drawing Sheets

COMBINED SHOCK ABSORBER AND JOUNCE BUMPER BODY FOR A VEHICLE SUSPENSION ASSEMBLY

TECHNICAL FIELD

Example embodiments generally relate to suspension system components and, more particularly, relate to a combined shock absorber and jounce bumper body.

BACKGROUND

Hydraulic jounce bumpers are common additions to suspension systems to add additional damping. At the end of suspension travel, hydraulic jounce bumpers complement the primary shock absorbers of the suspension system at full compression of the shock absorber and the suspension system. However, present hydraulic jounce bumpers are often completely separated from the shock absorber body. The separated nature of the hydraulic jounce bumpers may increase assembly complexity. Therefore, a combined shock absorber body and hydraulic jounce bumper may be desired.

BRIEF SUMMARY OF SOME EXAMPLES

In accordance with an example embodiment, a suspension system for vehicle may be provided. The vehicle suspension system may include a shock absorber to dampen vehicle movement, and a hydraulic jounce bumper to provide additional damping to the suspension system. The shock absorber may include a first end operably coupled to a frame of the vehicle and a second end operably coupled to a wheel assembly of the vehicle, and the hydraulic jounce bumper may include a mounting end and engagement end. The first end of the shock absorber and the mounting end of the hydraulic jounce bumper may integrate within a singular body.

In another example embodiment, a suspension system for a vehicle may be provided. The suspension system may include a shock absorber and a coil spring to dampen vehicle movement, and a hydraulic jounce bumper to provide additional damping to the suspension system. The shock absorber may include a first end operably coupled to a frame of the vehicle and a second end operably coupled to a wheel assembly of the vehicle, and the hydraulic jounce bumper may include a mounting end and engagement end. The first end of the shock absorber and the mounting end of the hydraulic jounce bumper may integrate within a singular body, and the shock absorber and the hydraulic jounce bumper may extend through the coil spring.

In an example embodiment, a suspension system for a vehicle may be provided. The suspension system may include a shock absorber and a coil spring to dampen vehicle movement, and a hydraulic jounce bumper to provide additional damping to the suspension system. The shock absorber may include a first end operably coupled to a frame of the vehicle and a second end operably coupled to a wheel assembly of the vehicle, and the hydraulic jounce bumper may include a mounting end and engagement end. The first end of the shock absorber and the mounting end of the hydraulic jounce bumper may integrate within a singular body. The shock absorber may extend through the coil spring, and the hydraulic jounce bumper may extend outside the coil spring.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
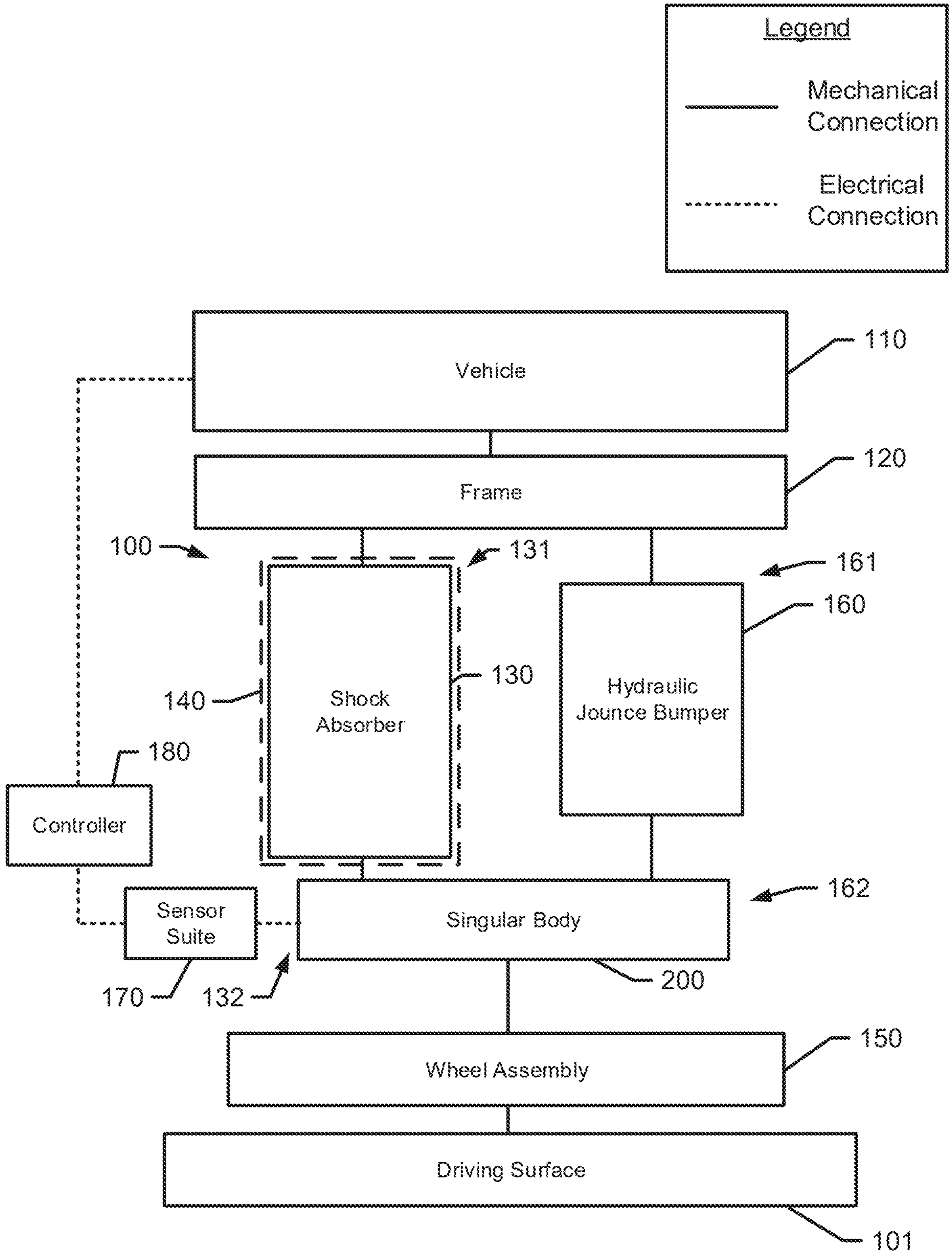
FIG. 1 depicts a block diagram of a suspension system for a vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Additionally, as used herein, terminology such as "about" and "substantially" should be understood to be definite approximations that account for variations in measurements that cannot be, or as one of skill in the art would appreciate, normally are not, measured precisely. Thus, for example, a parameter that is "about" or "substantially" a given value or a given characteristic should be understood to be sufficiently close to the given value or given characteristic such that performance of the object or product to which the parameter applies, from the perspective of one with ordinary skill in the art, is the same as though the object or product had precisely the given value or characteristic.

Some example embodiments described herein may address the issues described above. In this regard, for example, some embodiments may provide a shared body for a shock absorber and a hydraulic jounce bumper to increase performance of a vehicle and suspension system. As a result, the addition of the shared body may increase suspension system performance and decrease assembly complexity.

FIG. 1 illustrates a block diagram of a suspension system 100 for a vehicle 110 in accordance with an example embodiment. As seen in FIG. 1, in some cases, the vehicle 110 may include a frame 120. In an example embodiment, the frame 120 may be a chassis or body of the vehicle 110. In some cases, the chassis or frame 120 may support and form the foundation structure of the vehicle 110. In an example embodiment, the chassis and/or frame 120 may additionally be formed of one or more subframes or may be a unibody construction, and a shock absorber 130 may be operably coupled to the chassis or frame 120 to help operably couple a wheel assembly 150.

For example, the suspension system 100 may include a control arm. The control arm may assist in operably coupling a wheel assembly 150 to the frame 120. The control arm may operably couple to a knuckle of the wheel assembly 150 to allow for movement of the wheel assembly 150 while maintaining wheel alignment.

In some cases, the shock absorber 130 may be one or more vertical dampers. For example, the vehicle 110 may include one instance of the shock absorber 130 on a first side of the vehicle 110 and another instance of the shock absorber 130 on a second side of the vehicle 110, or also known as a staggered shock set up. The shock absorber 130 may absorb or dampen the compression (jounce) and rebound of the frame 120 while the vehicle 110 is in motion. The shock absorber 130 may be referred to as and/or be a vertical suspension damper, a strut, or any other suspensions member that may dampen the vehicle 110. The shock absorber 130 may be positioned at angle between 70 degrees and 110 degrees relative to a driving surface 101 driven on by the vehicle 110 (e.g. vertically extend away from the driving surface 101). In some cases, the shock absorber 130 may be an active, semi-active, or passive damper and may be a hydraulic damper. In an example embodiment, the active or semi-active dampers may utilize measurements from a sensor suite 170 of the vehicle 110 to adjust the dampers.

In an example embodiment, the suspension system 100 may include a hydraulic jounce bumper 160. The hydraulic jounce bumper 160 may be disposed proximate the shock absorber 130. In some cases, the hydraulic jounce bumper 160 may have the same orientation as the shock absorber 130 in order to provide additional damping in the same direction as the shock absorber 130. The hydraulic jounce bumper 160 may provide the additional damping in response to the shock absorber 130 experiencing a max compression event. A max compression event may be defined as an event in which the shock absorber 130 fully compresses and provides the maximum damping possible for the shock absorber 130 at its present settings.

Immediately before a max compression event (e.g. traversing uneven terrain on an off-roading path, encountering certain chassis input such as ruts or bumps) or in response to a max compression event occurring, the hydraulic jounce bumper 160 may engage and provide the additional damping. The engagement of the hydraulic jounce bumper 160 may prevent or limit the compression of the suspension system 100 and thus limit the contact of components of the suspension system 100 or the wheel assembly 150 with the frame 120 or other vehicle components. The compression of the suspension system 100 may be considered jounce, and the return of the suspension system 100 from jounce may be considered rebound. The position of the suspension system 100 outside of jounce and rebound may be considered the resting position. The resting position may be defined as the position of the suspension system 100 responsive to the vehicle 110 traversing a smooth driving surface or the position of the suspension system 100 according the factory design.

In an example embodiment, the suspension system 100 may include a coil spring 140. The coil spring 140 may assist the shock absorber 130 and the hydraulic jounce bumper 160 in providing damping for the suspension system 100 and the vehicle 110 as a whole. In some cases, the coil spring 140 may surround a portion of the shock absorber 130. In this regard, the shock absorber 130 may extend through the coil spring. Due to the extension through the coil spring 140, the shock absorber 130 may share a common load path with the coil spring 140.

In an example embodiment, the shock absorber 130 may include a first end 131 and a second end 132. The first end 131 may operably couple with the frame 120 of the vehicle 110, and the second end 132 may operably couple with the wheel assembly 150. In some cases, the hydraulic jounce bumper 160 may also include an engagement end 161 and a mounting end 162. The engagement end 161 of the hydraulic jounce bumper 160 may be disposed proximate the first end 131 of the shock absorber 130, and the mounting end 162 of the hydraulic jounce bumper 160 may be disposed proximate the second end 132 of the shock absorber 130. The engagement end 161 may operably couple with a component of the suspension system 100 or vehicle 110 to actuate/engage the hydraulic jounce bumper 160 to provide additional damping, and the mounting end 162 may assist in operably coupling the hydraulic jounce bumper 160 to the vehicle 110 and/or other systems or assemblies (e.g. the suspension system 100, the wheel assembly 150, etc.). For example, the engagement end 161 may directly operably couple and/or engage with the frame 120 of the vehicle 110.

In some cases, the shock absorber 130 and the hydraulic jounce bumper 160 may share a singular body 200 or a common body. The singular body 200 may operably couple an end of each of the shock absorber 130 and the hydraulic jounce bumper 160. For example, the second end 132 of the shock absorber 130 and the mounting end 162 of the hydraulic jounce bumper 160 may be operably coupled to one another via the singular body 200. The singular body 200 may integrate the second end 132 and the mounting end 162, and thus the shock absorber 130 and the hydraulic jounce bumper 160, into a monolithic or unitary body.

In an example embodiment, the singular body 200 may align the shock absorber 130 and the hydraulic jounce bumper 160 to extend in the same direction or substantially parallel to one another. In some cases, due to the extension in the same direction, the singular body 200 may enable a common load path for the shock absorber 130 and the hydraulic jounce bumper 160. The common load path may ensure the hydraulic jounce bumper 160 provides additional damping to support the shock absorber 130 responsive to a max compression event. In this regard, an optimal motion ratio for the shock absorber 130, the hydraulic jounce bumper 160, and the coil spring 140 may occur.

In some cases, the suspension system 100 may include the sensor suite 170 and a controller 180. The controller 180 may be configured to receive data from the sensor suite 170 and may adjust the vehicle 110 or the suspension system 100 based on the data from the sensor suite 170. The sensor suite 170 may include but is not limited to frame height sensors (or chassis height sensors), suspension height sensors, fluid flow sensors, volume sensors, pressure sensors, wheel speed sensors, accelerometers, cameras, and global positioning sensors (GPS). The sensor suite 170 may also be a component of an active suspension system (e.g. operably coupled to the shock absorber 130 and hydraulic jounce bumper 160) and/or may be utilized by other vehicle assemblies and systems other than the suspension system 100. The controller 180 may also be configured to control or send inputs to displays or speakers of the vehicle 110.

In an example embodiment, the controller 180 may be a control module. In some cases, the controller 180 may include one or more control modules (i.e., sub-control modules or operably coupled to other control modules). The controller 180 may include processing circuitry that includes a processor and memory. The processing circuitry may be configured to provide electronic control of the inputs to one or more functional units of the suspension system 100 and to process data received at or generated by the one or more functional units of the suspension system 100. Thus, the processing circuitry may be configured to perform data processing, control function execution and/or other processing and management services according to an example embodiment. In some embodiments, the processing circuitry may be embodied as a semiconductor chip or chip set. In other words, the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry may therefore, in some cases, be configured to implement an embodiment of the present invention on a single chip or as a single "system on a chip." As such, in some cases, a chip or chipset may constitute means for performing one or more operations for providing the functionalities described herein. In an example embodiment, other vehicle control modules may include similar processing circuitry.

Figure 2:
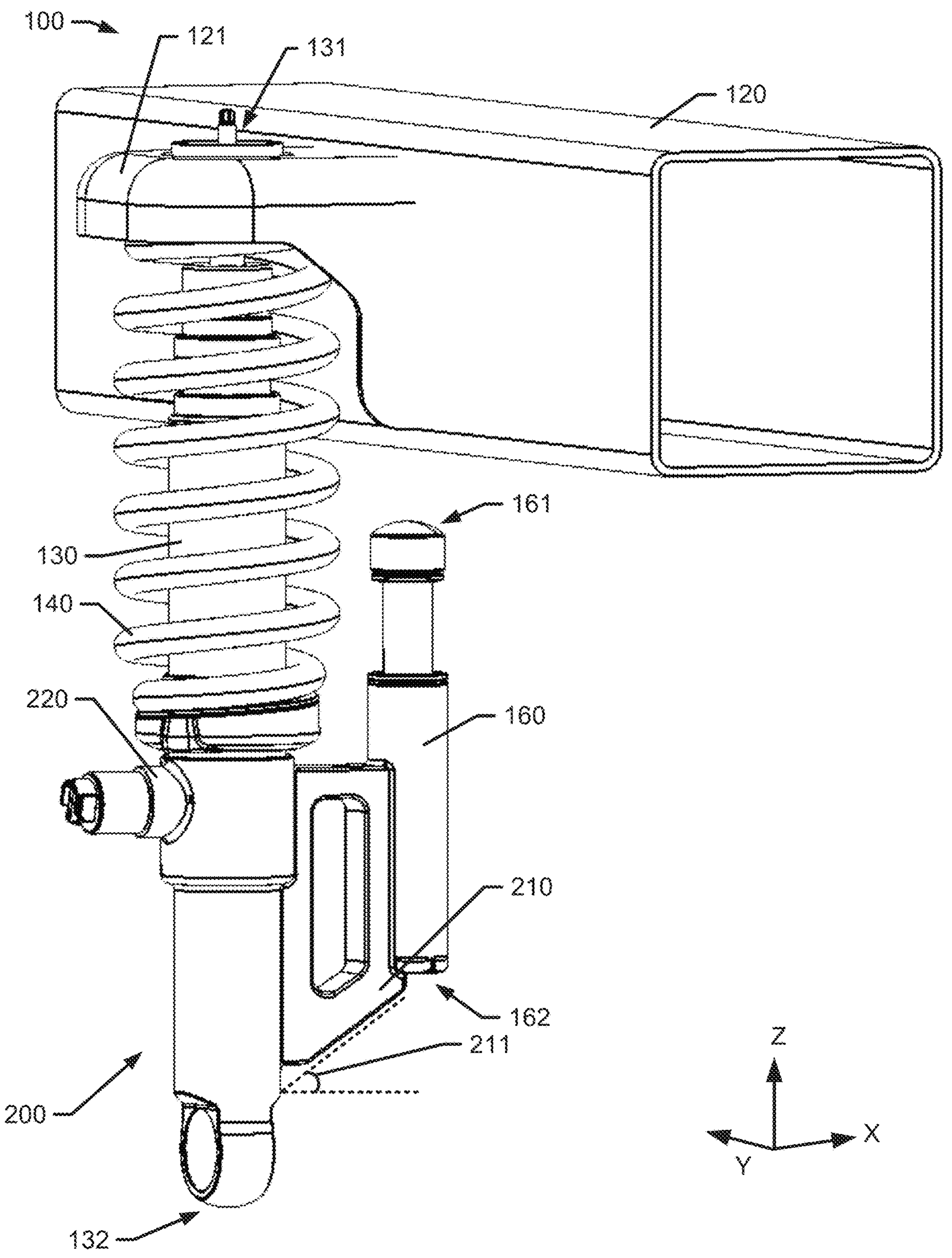
FIG. 2 illustrates a perspective view of a suspension system for a vehicle in accordance with an example embodiment.
Figure 3:
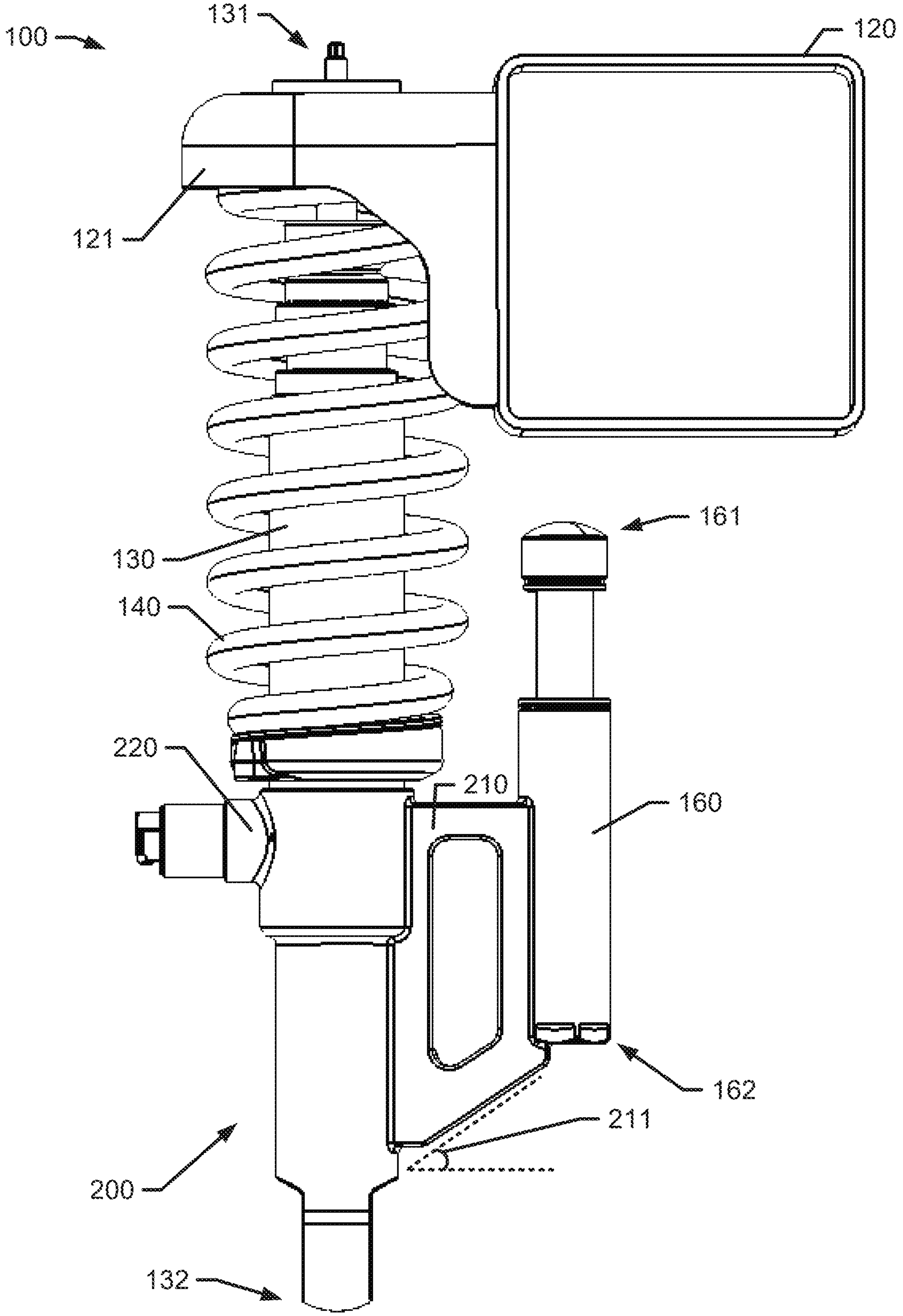
FIG. 3 depicts a side view of a suspension system for a vehicle in a resting position in accordance with an example embodiment.
Figure 4:
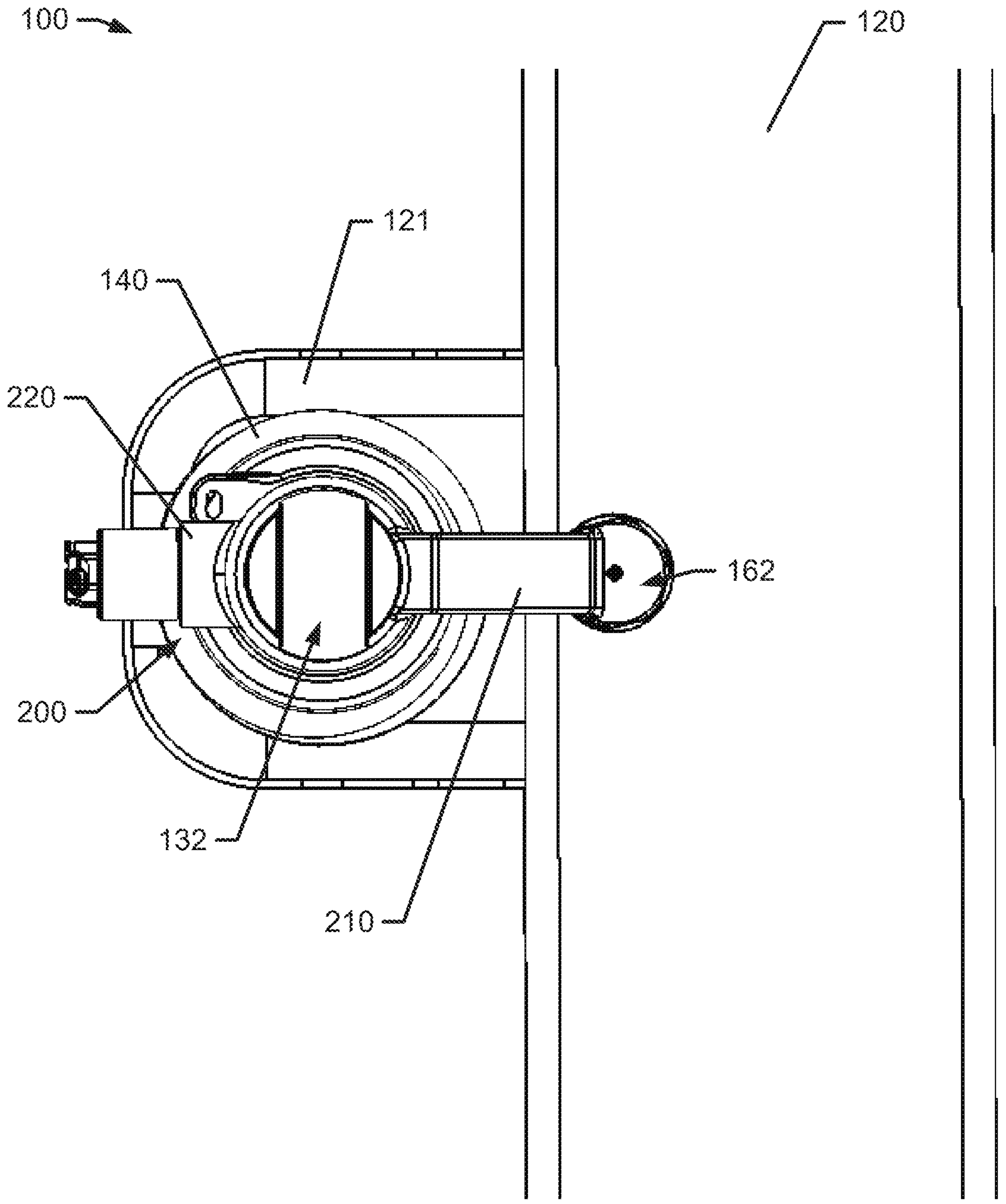
FIG. 4 illustrates a bottom view of a suspension system for a vehicle in a jounce position in accordance with an example embodiment.
Figure 5:
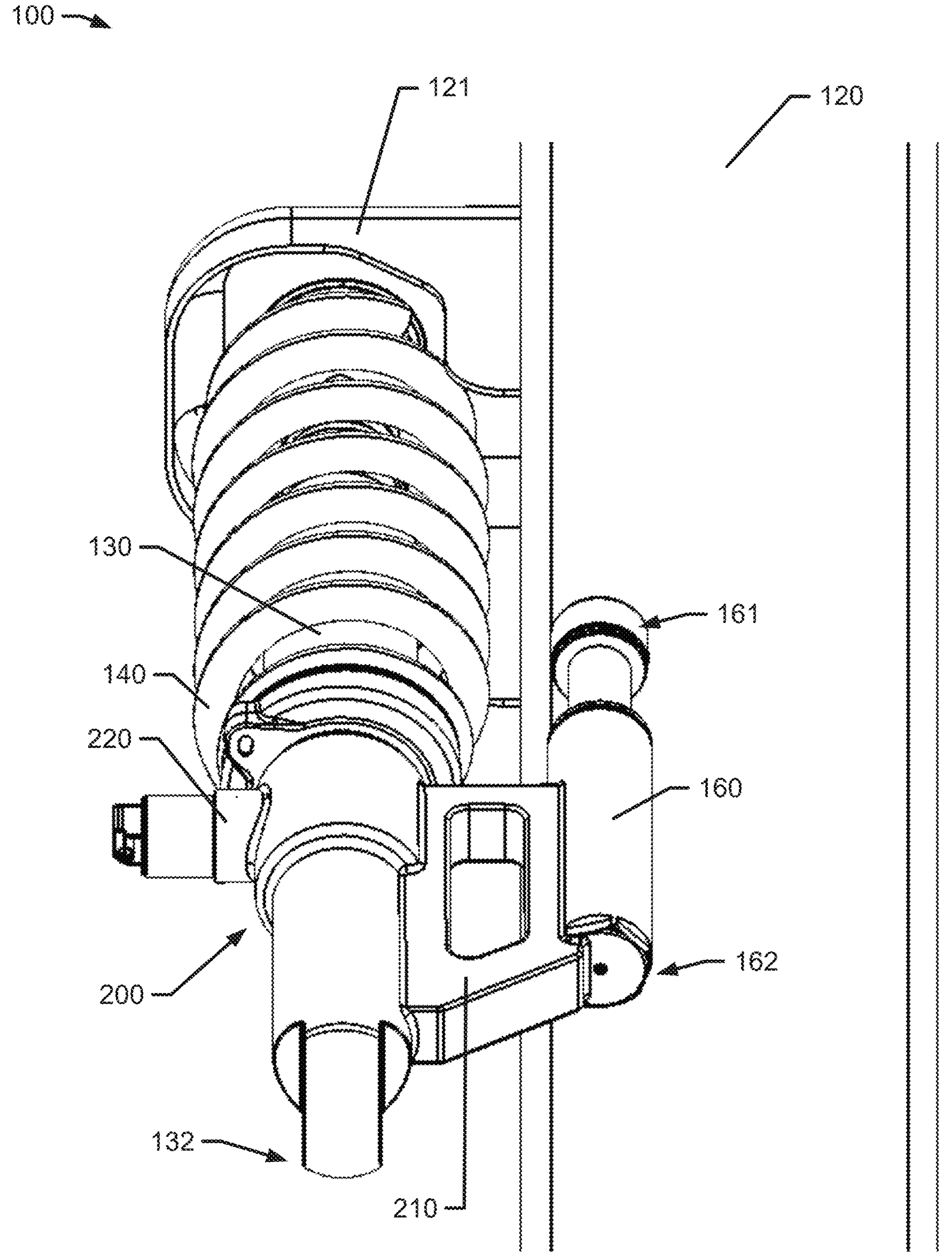
FIG. 5 depicts a bottom perspective view of a suspension system for a vehicle in a rebound position in accordance with an example embodiment.
Figure 6:
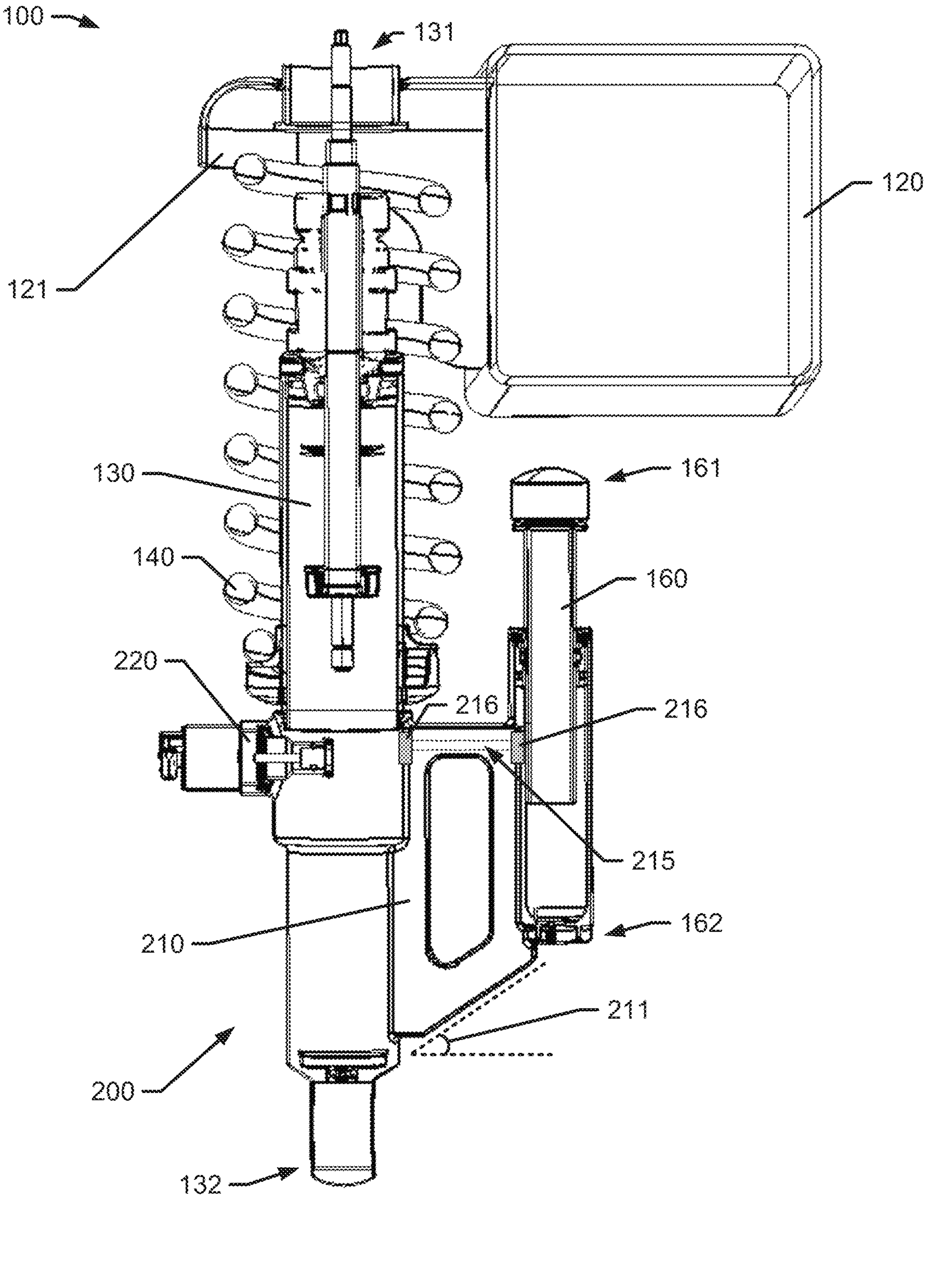
FIG. 6 illustrates a cross-section view of a suspension system for a vehicle in accordance with an example embodiment.

FIGS. 2-6 depict various views of the suspension assembly in accordance with an example embodiment. As shown in FIG. 2, the singular body 200 directly operably couple the hydraulic jounce bumper 160 and the shock absorber 130 to each other. More specifically, the mounting end 162 of hydraulic jounce bumper 160 and the second end 132 of the shock absorber 130 may be integrated into the singular body 200 to form a monolithic structure.

In some cases, the hydraulic jounce bumper 160 may align with a portion of the frame 120, and the shock absorber 130 may align with a spring seat 121 operably coupled to the frame 120. The spring seat 121 may be formed integrally with the frame 120 and may assist in operably coupling and housing the coil spring 140, as well as the shock absorber 130. For example, the first end 131 of the shock absorber 130 may operably couple to spring seat 121 via a receiving orifice and fastener disposed at the top of the spring seat 121. The first end 131 may extend through the receiving orifice and thus through the spring seat 121. The first end 131 and the engagement end 161 may be laterally separated. The lateral separation may ensure the shock absorber 130 and the hydraulic jounce bumper 160 actuate/engage independently and properly.

In an example embodiment, the frame 120, the shock absorber 130, and the hydraulic jounce bumper 160 may be manufactured of metals, metal alloys, or other metallic materials. In some cases, the engagement end 161 may include a cap manufactured of non-metallic material to limit metal-to-metal interactions upon engagement of hydraulic jounce bumper 160 responsive to a max compression event.

The shock absorber 130 and the hydraulic jounce bumper 160 may be oriented with the suspension system 100 extend vertically away from the driving surface 101 of the vehicle 110. While the shock absorber 130 and the hydraulic jounce bumper 160 may both extend in the same direction, the shock absorber 130 and hydraulic jounce bumper 160 may be offset relative to one another. In this regard, the first end 131 and the engagement end 161 may be vertically offset relative to one another despite being disposed proximate one another. Similarly, the second end 132 and the mounting end 162 may be vertically offset relative to one another despite being disposed proximate one another.

The offset orientation of the shock absorber 130 and the hydraulic jounce bumper 160 may enable a ride zone damping level for the suspension system 100. A ride zone damping level may be a damping level utilizing only the shock absorber 130 (e.g. less than a max compression event). The ride zone damping level may be the damping level most frequently experienced by the vehicle 110 and may include softer damping by only utilizing the shock absorber 130, thus resulting in a more comfortable ride. Upon engagement of the hydraulic jounce bumper 160, the damping level increases and stiffness of the suspension system 100 also increases. Typical daily driving may often not experience events where max damping is needed. In this regard, the offset orientation limits engagement of the hydraulic jounce bumper 160 to only occur responsive to the maximum compression events.

In some cases, the singular body 200 may create the offset orientation between the shock absorber 130 and the hydraulic jounce bumper 160. The singular body 200 may orientate the second end 132 of the shock absorber 130 and the mounting end 162 of the hydraulic jounce bumper 160 to create the offset, not only between the second end 132 and the mounting end 162 but also between the first end 131 and the engagement end 161.

The amount of offset for the offset orientation between the shock absorber 130 and the hydraulic jounce bumper 160 may vary from vehicle-to-vehicle. The amount of offset may be optimized to ensure the hydraulic jounce bumper 160 only engages responsive to max compression of the shock absorber 130. In this regard, an amount of time the damping level of the suspension system 100 is in the ride zone damping level may be maximized. In some cases, characteristics that affect the amount of offset may include but are not limited to a type of vehicle 110, a type of shock absorber 130, a type of hydraulic jounce bumper 160, a structure of the frame 120, and/or a damping setting of the shock absorber 130.

An angle 211 and structure of a connection portion 210 of the singular body 200 may create the offset orientation and the amount of offset between the shock absorber 130 and the hydraulic jounce bumper 160. A dynamic analysis may determine the optimal choice for the angle 211 and the structure of the connection portion 210. The connection portion 210 may also vary in structure depending on accessories/features/elements integrated within the suspension system 100 and the singular body 200.

In an example embodiment, the connection portion 210 may include a fluid passage 215. As seen in the cross-section view of FIG. 6, the fluid passage 215 may be integrated within the connection portion 210 to fluidly couple the shock absorber 130 and the hydraulic jounce bumper 160. In some cases, the shock absorber 130 may include hydraulic shock absorbers. In this regard, the fluid passage 215 may fluidly connect the hydraulic elements of the shock absorber 130 and the hydraulic jounce bumper 160. The connection portion 210 may include a hollow structure, and the hollow structure may be the fluid passage 215. The connection portion 210 may also include one or more instances of a valve 216 or solenoid to limit fluid travel between the shock absorber 130 and the hydraulic jounce bumper 160 via the fluid passage 215.

In an example embodiment, the singular body 200 may include additional connectors. For example, the singular body 200 may include an external connector 220. The external connector 220 may operably couple the shock absorber 130 and/or hydraulic jounce bumper 160 to external components or additional components of the suspension system 100 and the vehicle 110. In this regard, the external connector 220 may fluidly couple the shock absorber 130 and the hydraulic jounce bumper 160 to external fluid reservoirs of the suspension system 100 or other hydraulic mechanisms of the vehicle 110. In some cases, the external connector 220 may operably couple the shock absorber 130 and the hydraulic jounce bumper 160 to the sensor suite 170 and the controller 180 of the vehicle 110.

The singular body 200 and the connection portion 210 may also integrate sensors of the sensor suite 170 with the shock absorber 130 and the hydraulic jounce bumper 160. The sensors may collect telemetry data of the suspension system 100 and monitor performance of the shock absorber 130 and/or hydraulic jounce bumper 160. For example, engagement data (e.g. time, duration, amount, etc.) of the hydraulic jounce bumper 160 may be shared with the controller 180 via integrated sensors within the singular body 200 and the connection portion 210.

Figure 7:
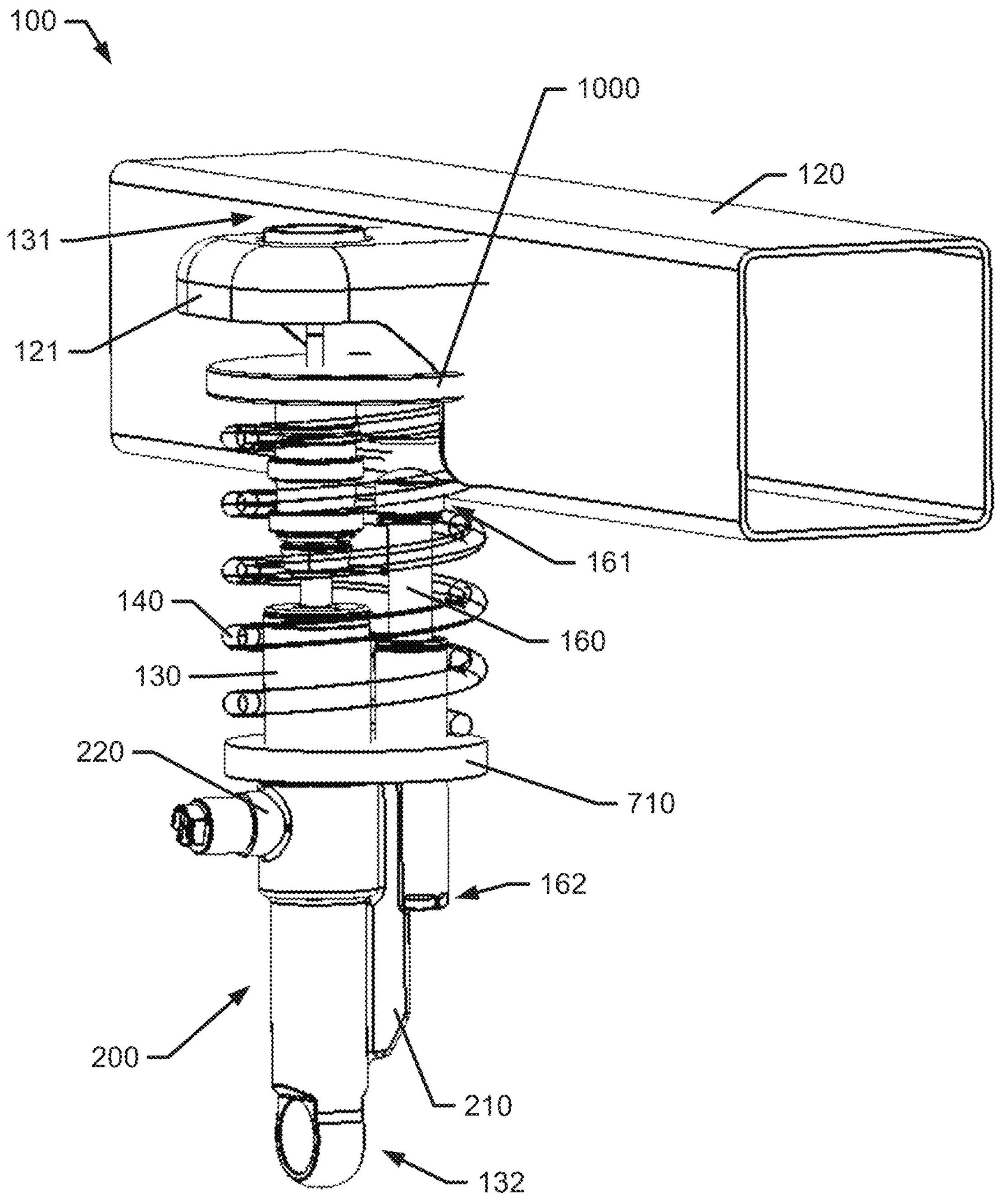
FIG. 7 illustrates a perspective view of a suspension system for a vehicle in a resting position in accordance with an example embodiment.
Figure 8:
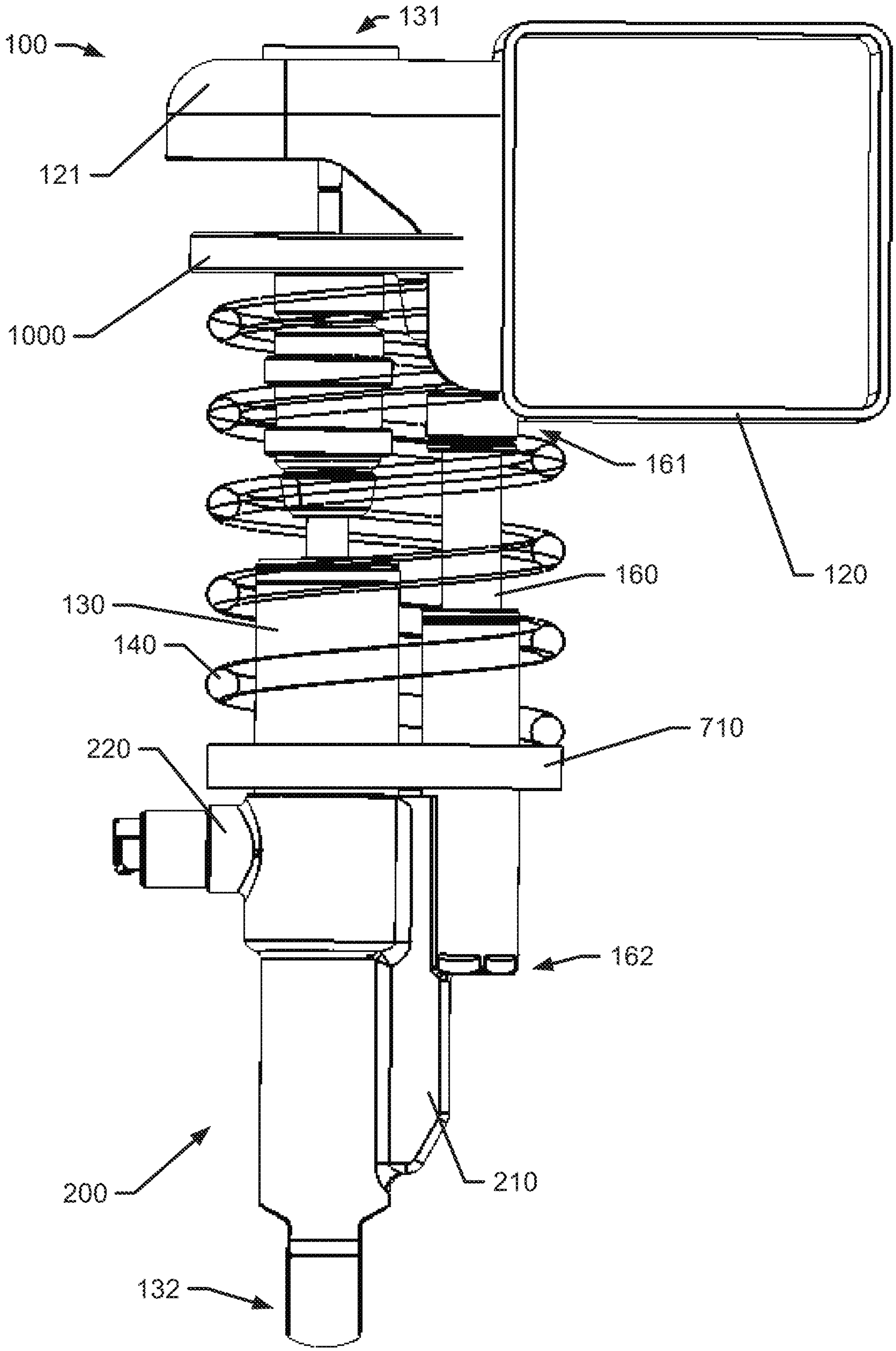
FIG. 8 depicts a side view of a suspension system for a vehicle in a jounce position in accordance with an example embodiment.
Figure 9:
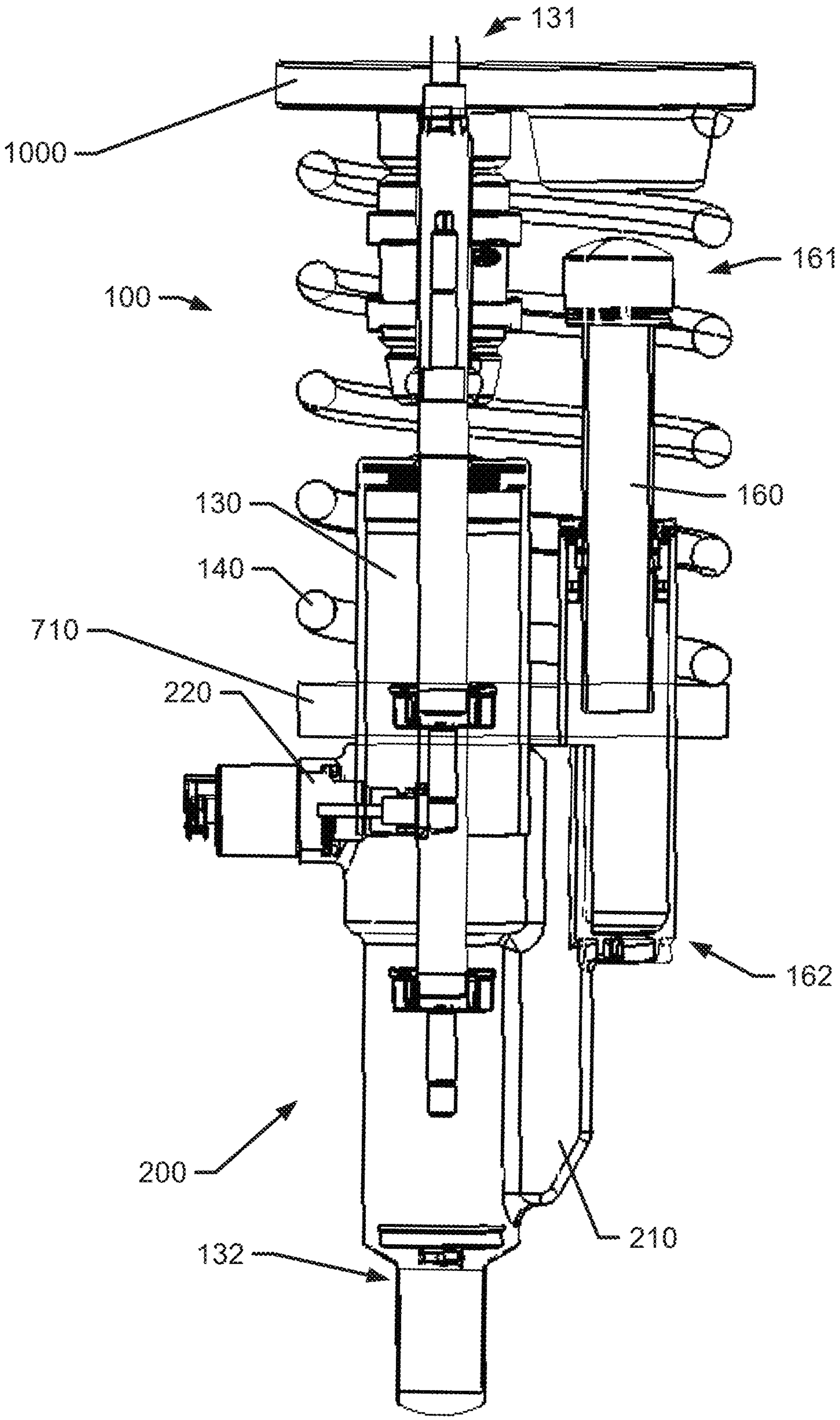
FIG. 9 illustrates a cross-section view of a suspension system for a vehicle in a rebound position in accordance with an example embodiment.

FIGS. 7-9 depict various views of the suspension system in accordance with an example embodiment. As seen in FIGS. 7-9, in some cases, the hydraulic jounce bumper 160 may be disposed and extend within the interior of the coil spring 140 (depicted as transparent/translucent in FIGS. 7-9 to better highlight the orientation of the suspension system 100) along with the shock absorber 130. In this regard, the load paths of the shock absorber 130, the coil spring 140, and the hydraulic jounce bumper 160 may not only be aligned but compact to ensure optimal damping is provided to the suspension system 100 and the vehicle 110.

To assist in the positioning and alignment of the hydraulic jounce bumper 160 within the coil spring 140, the singular body 200 may integrate the second end 132 and the mounting end 162 together. Additionally, the suspension system 100 may include a modified spring seat 710 to allow both the shock absorber 130 and the hydraulic jounce bumper 160 to extend though the modified spring seat 710, as well as anchor the coil spring 140. In some cases, the modified spring seat 710 may integrate with the singular body 200 to decrease complexity in assembly of the suspension system 100. The first end 131 and the engagement end 161 may still be laterally separated to ensure proper and isolated engagement of the shock absorber 130 and hydraulic jounce bumper 160.

Figure 10:
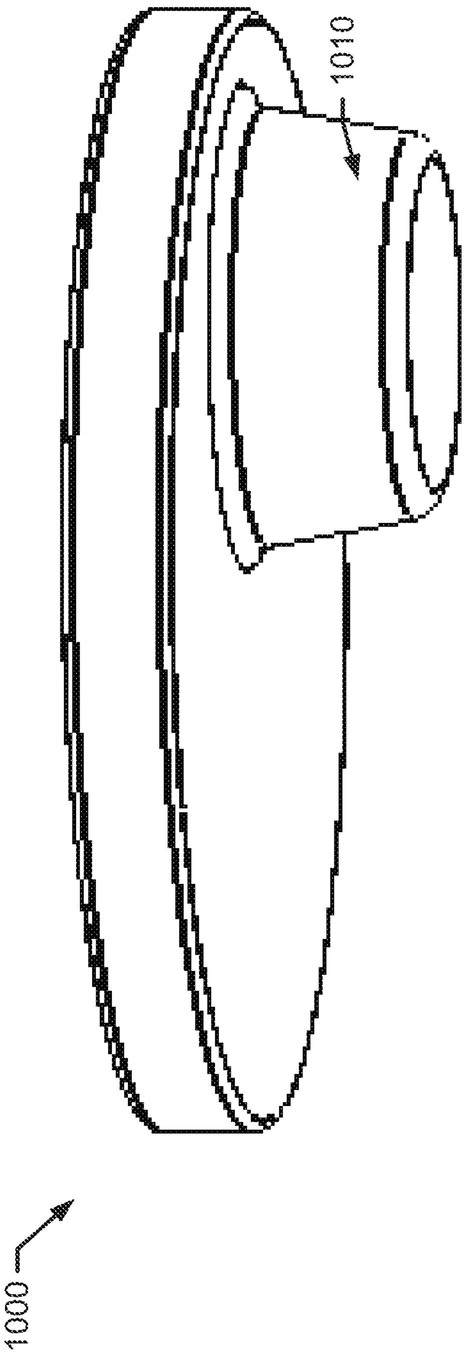
FIG. 10 depicts a perspective view of a top mount for a suspension system in a rebound position in accordance with an example embodiment.

FIG. 10 depicts a top mount of a suspension system in accordance with an example embodiment. In an example embodiment, the suspension system 100 may include a top mount 1000. The top mount 1000 may operably couple with the coil spring 140 to assist in operably coupling the coil spring 140 with the suspension system 100. The shock absorber 130 may extend through the top mount 1000 and operably couple with the spring seat 121.

In some cases, the top mount 1000 may include a contact pad 1010. The contact pad 1010 may align with the engagement end 161 of the hydraulic jounce bumper 160. Responsive to a maximum compression event, the engagement end 161 and the hydraulic jounce bumper 160 as a whole may engage with the contact pad 1010 of the top mount 1000, and thus provide additional damping to the suspension system 100 and the vehicle 110. A portion of the top mount 1000, including but not limited to the contact pad 1010, may consist of an elastomer material to limit metal-to-metal contact with the shock absorber 130, the coil spring 140, and the hydraulic jounce bumper 160. The top mount 1000 may integrate with the frame.

In an example embodiment, the singular body 200 may be manufactured via an additive manufacturing process. The additive manufacturing process may include 3-D printing system with multiple printers and/or nozzles capable integrating multiple materials to form the singular body 200 as a monolithic or unitary body. The additive manufacturing process may integrated the fluid passage 215, as well as the any sensors of the sensor suite 170 or the external connector 220, directly with the singular body 200. In some cases, a dynamic design process may strategize the structure and design of the singular body 200 and the integration of any components/features/elements/accessories. For example, the manufacturing and design process may position the fluid passage 215 within the connection portion 210 for optimal fluid dynamics and to account for varying pressure waves and flow characteristics under engagement of the shock absorber 130 and the hydraulic jounce bumper 160. In a similar regard, the manufacturing and design process may position may optimize the overall structure and design of the singular body 200 for performance. For example, unnecessary portions of the connection portion 210 for the performance of the suspension system 100 may be removed for increased performance via weight reduction and increased aerodynamics.

In an example embodiment, the shock absorber 130 and the hydraulic jounce bumper 160 may both be made of the same or similar materials. The material may include but is not limited to aluminum, steel, or other metal alloys. In some cases, at least a portion of the shock absorber 130 and the hydraulic jounce bumper 160 may include an elastomer or elastomeric material to prevent metal-on-metal contact and limit noise. The elastomer may include but is not limited to rubber, polymers, or other materials that allow for quiet engagement between the shock absorber 130/hydraulic jounce bumper 160 and another component of the suspension system 100 or vehicle 110.

A suspension system for a vehicle may be provided. The suspension system may include a shock absorber to dampen vehicle movement, and a hydraulic jounce bumper to provide additional damping to the suspension system. The shock absorber may include a first end operably coupled to a frame of the vehicle and a second end operably coupled to a wheel assembly of the vehicle, and the hydraulic jounce bumper may include a mounting end and engagement end. The first end of the shock absorber and the mounting end of the hydraulic jounce bumper may integrate within a singular body.

The suspension system for a vehicle of some embodiments may include additional features, modifications, augmentations and/or the like to achieve further objectives or enhance performance of the suspension system. The additional features, modifications, augmentations and/or the like may be added in any combination with each other. Below is a list of various additional features, modifications, and augmentations that can each be added individually or in any combination with each other. For example, the shock absorber may extend in a first direction between the first end and the second end, the hydraulic jounce bumper may extend in a second direction between the mounting end and the engagement end, and the first direction and the second direction may be substantially parallel. In some cases, a coil spring may be disposed between the first end and the second, and the shock absorber may extend through the coil spring. In an example embodiment, the hydraulic jounce bumper may extend outside the coil spring. In some cases, the engagement end may be configured to contact the frame of the vehicle responsive to a maximum jounce event. In an example embodiment, the hydraulic shock absorber extends inside the coil spring. In some cases, the engagement end may be configured to contact a spring mount of the suspension system responsive to a maximum jounce event. In an example embodiment, the singular body may include a hydraulic fluid passage, and the hydraulic fluid passage may be fluidly connected to both the shock absorber and the hydraulic jounce bumper. In some cases, the first end and the mounting end may be offset vertically relative to a driving surface of the vehicle. In an example embodiment, the second end and the engagement end may be offset vertically relative to a driving surface of the vehicle.

A suspension system for a vehicle may be provided in accordance with an example embodiment. The suspension system may include a shock absorber and a coil spring to dampen vehicle movement, and a hydraulic jounce bumper to provide additional damping to the suspension system. The shock absorber may include a first end operably coupled to a frame of the vehicle and a second end operably coupled to a wheel assembly of the vehicle, and the hydraulic jounce bumper may include a mounting end and engagement end. The first end of the shock absorber and the mounting end of the hydraulic jounce bumper may integrate within a singular body, and the shock absorber and the hydraulic jounce bumper may extend through the coil spring.

A suspension system for a vehicle may be provided in accordance with another example embodiment. The suspension system may include a shock absorber and a coil spring to dampen vehicle movement, and a hydraulic jounce bumper to provide additional damping to the suspension system. The shock absorber may include a first end operably coupled to a frame of the vehicle and a second end operably coupled to a wheel assembly of the vehicle, and the hydraulic jounce bumper may include a mounting end and engagement end. The first end of the shock absorber and the mounting end of the hydraulic jounce bumper may integrate within a singular body. The shock absorber may extend through the coil spring, and the hydraulic jounce bumper may extend outside the coil spring.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to difficulties are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A suspension system for a vehicle, the suspension system comprising:
- a shock absorber to dampen vehicle movement; and
- a hydraulic jounce bumper to provide additional damping to the suspension system,
- wherein the shock absorber includes a first end operably coupled to a frame of the vehicle and a second end operably coupled to a wheel assembly of the vehicle,
- wherein the hydraulic jounce bumper includes a mounting end and engagement end, and
- wherein the first end of the shock absorber and the mounting end of the hydraulic jounce bumper integrate within a singular body,
- wherein the shock absorber extends in a first direction between the first end and the second end,
- wherein the hydraulic jounce bumper extends in a second direction between the mounting end and the engagement end, and
- wherein the first direction and the second direction are substantially parallel, and
- wherein the hydraulic jounce bumper and the shock absorber extend along different axes.

2. The suspension system of claim 1, further comprising a coil spring disposed between the first end and the second, and
- wherein the shock absorber extends through the coil spring.

3. The suspension system of claim 2, wherein the hydraulic jounce bumper extends outside the coil spring.

4. The suspension system of claim 3, wherein the engagement end is configured to contact the frame of the vehicle responsive to a maximum jounce event.

5. The suspension system of claim 2, wherein the hydraulic shock absorber extends inside the coil spring.

6. The suspension system of claim 5, wherein the engagement end is configured to contact a spring mount of the suspension system responsive to a maximum jounce event.

7. The suspension system of claim 1, wherein the singular body includes a hydraulic fluid passage, and
- wherein the hydraulic fluid passage is fluidly connected to both the shock absorber and the hydraulic jounce bumper.

8. The suspension system of claim 1, wherein the first end and the mounting end are offset vertically relative to a driving surface of the vehicle.

9. The suspension system of claim 1, wherein the second end and the engagement end are offset vertically relative to a driving surface of the vehicle.

10. A suspension system for a vehicle, the suspension system comprising:
- a shock absorber and a coil spring to dampen vehicle movement; and
- a hydraulic jounce bumper to provide additional damping to the suspension system;

wherein the shock absorber includes a first end operably coupled to a frame of the vehicle and a second end operably coupled to a wheel assembly of the vehicle, wherein the hydraulic jounce bumper includes a mounting end and engagement end, wherein the first end of the shock absorber and the mounting end of the hydraulic jounce bumper integrate within a singular body, wherein the shock absorber and the hydraulic jounce bumper extend through the coil spring, wherein the shock absorber extends in a first direction between the first end and the second end, wherein the hydraulic jounce bumper extends in a second direction between the mounting end and the engagement end, wherein the first direction and the second direction are substantially parallel, and wherein the hydraulic jounce bumper and the shock absorber extend along different axes.

11. The suspension system of claim 10, wherein the engagement end is configured to contact a spring mount of the suspension system responsive to a maximum jounce event.

12. The suspension system of claim 10, wherein the singular body includes a hydraulic fluid passage, and wherein the hydraulic fluid passage is fluidly connected to both the shock absorber and the hydraulic jounce bumper.

13. The suspension system of claim 10, wherein the first end and the mounting end are offset vertically relative to a driving surface of the vehicle, and wherein the second end and the engagement end are offset vertically relative to a driving surface of the vehicle.

14. A suspension system for a vehicle, the suspension system comprising:

a shock absorber and a coil spring to dampen vehicle movement; and a hydraulic jounce bumper to provide additional damping to the suspension system;

wherein the shock absorber includes a first end operably coupled to a frame of the vehicle and a second end operably coupled to a wheel assembly of the vehicle, wherein the hydraulic jounce bumper includes a mounting end and engagement end, wherein the first end of the shock absorber and the mounting end of the hydraulic jounce bumper integrate within a singular body, wherein the shock absorber extends through the coil spring, and wherein the hydraulic jounce bumper extends outside the coil spring.

15. The suspension system of claim 14, wherein the engagement end is configured to contact the frame of the vehicle responsive to a maximum jounce event.

16. The suspension system of claim 14, wherein the shock absorber extends in a first direction between the first end and the second end, wherein the hydraulic jounce bumper extends in a second direction between the mounting end and the engagement end, and wherein the first direction and the second direction are substantially parallel.

17. The suspension system of claim 14, wherein the singular body includes a hydraulic fluid passage, and wherein the hydraulic fluid passage is fluidly connected to both the shock absorber and the hydraulic jounce bumper.

18. The suspension system of claim 14, wherein the first end and the mounting end are offset vertically relative to a driving surface of the vehicle, and wherein the second end and the engagement end are offset vertically relative to a driving surface of the vehicle.

* * * * *